United States Patent [19]
Hemry

[11] Patent Number: 6,098,530
[45] Date of Patent: Aug. 8, 2000

[54] MECHANICAL NUT CRACKER

[76] Inventor: Larry H. Hemry, P.O. Box 532, Sumas, Wash. 98295-0532

[21] Appl. No.: 09/494,369

[22] Filed: Jan. 31, 2000

[51] Int. Cl.[7] ..................................................... A23N 5/00
[52] U.S. Cl. .............................. 99/575; 99/568; 99/574; 99/579; 99/580; 99/581; 99/617
[58] Field of Search ............................ 99/568, 571–582, 99/617–622; 426/481–485; D7/680

[56] References Cited

U.S. PATENT DOCUMENTS

| | | | |
|---|---|---|---|
| D. 267,301 | 12/1982 | Hunt | D7/680 |
| 1,342,692 | 6/1920 | Pape | 99/575 |
| 2,144,841 | 1/1939 | Glaser | 99/579 X |
| 2,316,025 | 4/1943 | Smith | 99/574 X |
| 2,321,795 | 6/1943 | Buckman | 99/575 |
| 2,549,881 | 4/1951 | Berg et al. | 99/579 X |
| 3,628,580 | 12/1971 | Langston | 99/578 |
| 3,662,799 | 5/1972 | Shaw | 99/574 |
| 4,201,126 | 5/1980 | Evans | 99/579 |
| 4,218,968 | 8/1980 | Livingston | 99/617 X |
| 4,526,092 | 7/1985 | Greenblatt et al. | 99/575 |
| 4,793,248 | 12/1988 | Frederikson et al. | 99/575 X |
| 5,247,879 | 9/1993 | Frederiksen et al. | 99/575 |

*Primary Examiner*—Timothy Simone

[57] ABSTRACT

A mechanical nut cracker for a machine having an adjustably positioned crushing plate and crusher bar for cracking various types of nuts. The mechanical nut cracker includes a crusher assembly having a crusher bar rotationally attached to an end of a base member. The crusher assembly further includes a pair of side walls and a slanted back wall extending upwardly from the crusher bar and between the side walls. A crusher plate assembly is adjustably coupled to the base member for positioning in spaced relationship to the crusher bar. The crusher plate assembly includes a crusher plate, a pair of plate assembly side walls, and a slanted front wall extending up from the crusher plate and between the plate assembly side walls. The crusher plate assembly further includes a pair of arms extending outwardly for adjustably engaging the base member.

14 Claims, 3 Drawing Sheets

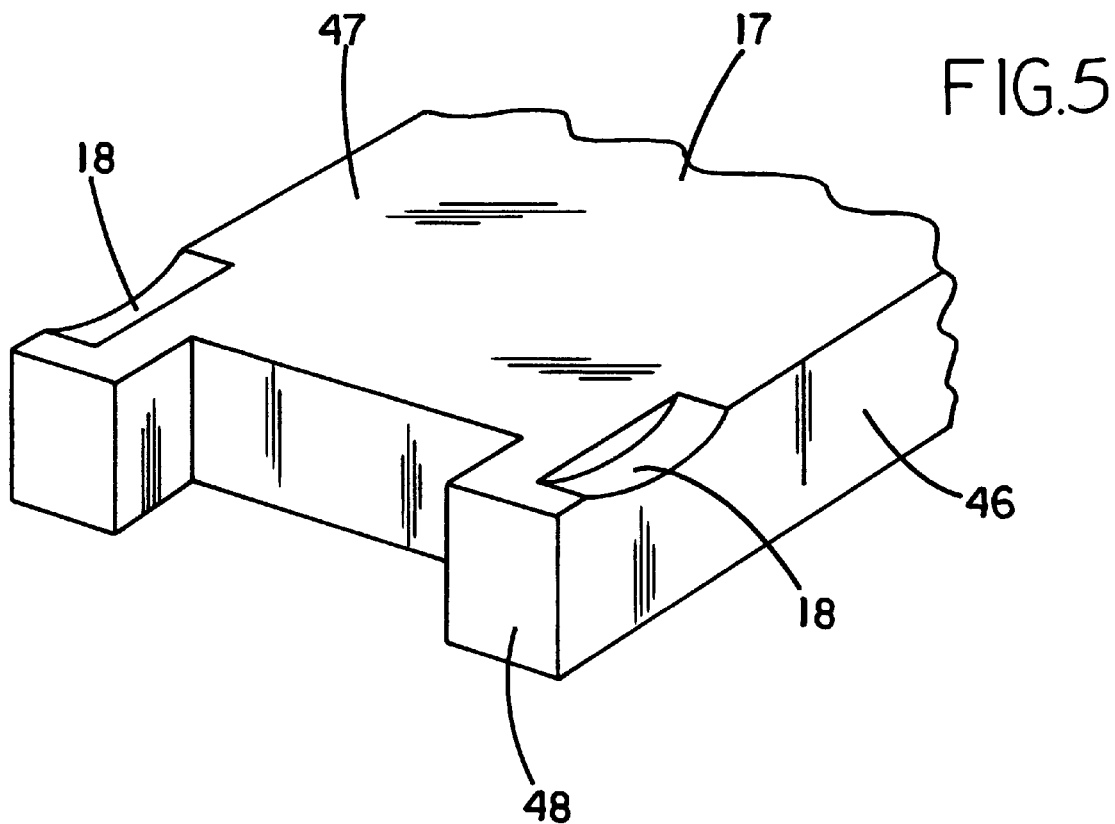
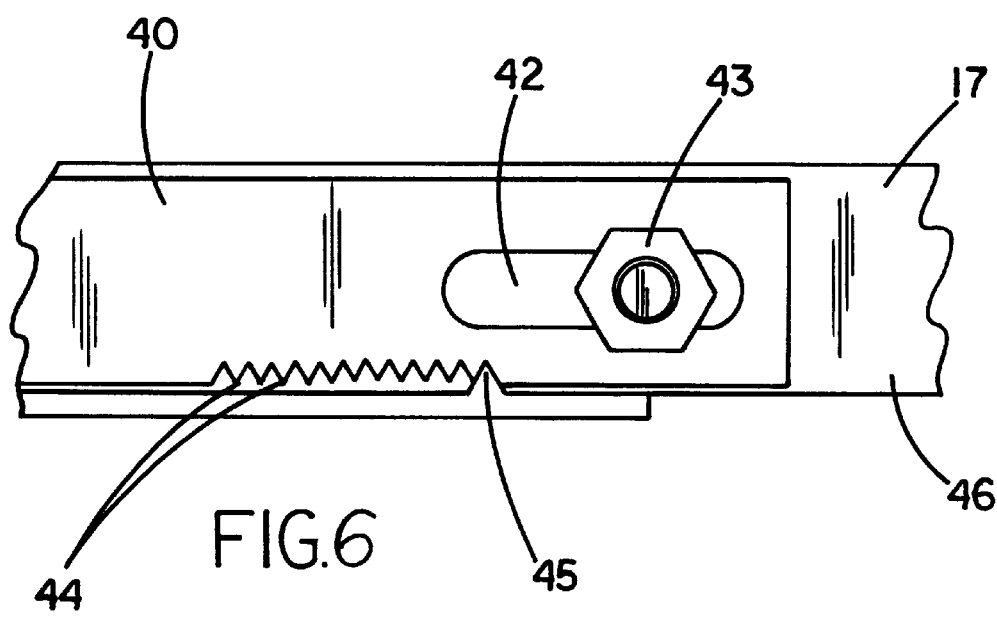

MECHANICAL NUT CRACKER

BACKGROUND OF THE INVENTION

1. Field of the Invention

The present invention relates to nut crackers and more particularly pertains to a new mechanical nut cracker for a machine having an adjustably positioned crushing plate and crusher bar for cracking various types of nuts.

2. Description of the Prior Art

The use of nut crackers is known in the prior art. More specifically, nut crackers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 3,662,799; U.S. Pat. No. 3,628,580; U.S. Pat. No. 4,526,092; U.S. Pat. No. 5,247,879; U.S. Pat. No. 2,321,795; and U.S. Pat. No. Des. 267,301.

While these devices fulfill their respective, particular objectives and requirements, the aforementioned patents do not disclose a new mechanical nut cracker. The inventive device includes a crusher assembly having a crusher bar rotationally attached to an end of a base member. The crusher assembly further includes a pair of side walls and a slanted back wall extending upwardly from the crusher bar and between the side walls. A crusher plate assembly is adjustably coupled to the base member for positioning in spaced relationship to the crusher bar. The crusher plate assembly includes a crusher plate, a pair of plate assembly side walls, and a slanted front wall extending up from the crusher plate and between the plate assembly side walls. The crusher plate assembly further includes a pair of arms extending outwardly for adjustably engaging the base member.

In these respects, the mechanical nut cracker according to the present invention substantially departs from the conventional concepts and designs of the prior art, and in so doing provides an apparatus primarily developed for the purpose of a machine having an adjustably positioned crushing plate and crusher bar for cracking various types of nuts.

SUMMARY OF THE INVENTION

In view of the foregoing disadvantages inherent in the known types of nut crackers now present in the prior art, the present invention provides a new mechanical nut cracker construction wherein the same can be utilized for a machine having an adjustably positioned crushing plate and crusher bar for cracking various types of nuts.

The general purpose of the present invention, which will be described subsequently in greater detail, is to provide a new mechanical nut cracker apparatus and method which has many of the advantages of the nut crackers mentioned heretofore and many novel features that result in a new mechanical nut cracker which is not anticipated, rendered obvious, suggested, or even implied by any of the prior art nut crackers, either alone or in any combination thereof.

To attain this, the present invention generally comprises a crusher assembly having a crusher bar rotationally attached to an end of a base member. The crusher assembly further includes a pair of side walls and a slanted back wall extending upwardly from the crusher bar and between the side walls. A crusher plate assembly is adjustably coupled to the base member for positioning in spaced relationship to the crusher bar. The crusher plate assembly includes a crusher plate, a pair of plate assembly side walls, and a slanted front wall extending up from the crusher plate and between the plate assembly side walls. The crusher plate assembly further includes a pair of arms extending outwardly for adjustably engaging the base member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new mechanical nut cracker apparatus and method which has many of the advantages of the nut crackers mentioned heretofore and many novel features that result in a new mechanical nut cracker which is not anticipated, rendered obvious, suggested, or even implied by any of the prior art nut crackers, either alone or in any combination thereof.

It is another object of the present invention to provide a new mechanical nut cracker that may be easily and efficiently manufactured and marketed.

It is a further object of the present invention to provide a new mechanical nut cracker that is of a durable and reliable construction.

An even further object of the present invention is to provide a new mechanical nut cracker which is susceptible of a low cost of manufacture with regard to both materials and labor, and which accordingly is then susceptible of low prices of sale to the consuming public, thereby making such mechanical nut cracker economically available to the buying public.

Still yet another object of the present invention is to provide a new mechanical nut cracker which provides in the apparatuses and methods of the prior art some of the advantages thereof, while simultaneously overcoming some of the disadvantages normally associated therewith.

Still another object of the present invention is to provide a new mechanical nut cracker for a machine having an adjustably positioned crushing plate and crusher bar for cracking various types of nuts.

Yet another object of the present invention is to provide a new mechanical nut cracker which includes a crusher assembly having a crusher bar rotationally attached to an end of a base member. The crusher assembly further includes a pair of side walls and a slanted back wall extending upwardly from the crusher bar and between the side walls. A crusher plate assembly is adjustably coupled to the base member for positioning in spaced relationship to the crusher bar. The crusher plate assembly includes a crusher plate, a pair of plate assembly side walls, and a slanted front wall extending up from the crusher plate and between the plate assembly side walls. The crusher plate assembly further includes a pair of arms extending outwardly for adjustably engaging the base member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a perspective view of the base member illustrating the arcuate depressions of the present invention.

FIG. 6 is a side view of the base member illustrating how the attachment plates are coupled to the base member of the present invention.

DESCRIPTION OF THE PREFERRED EMBODIMENT

Figure 1:
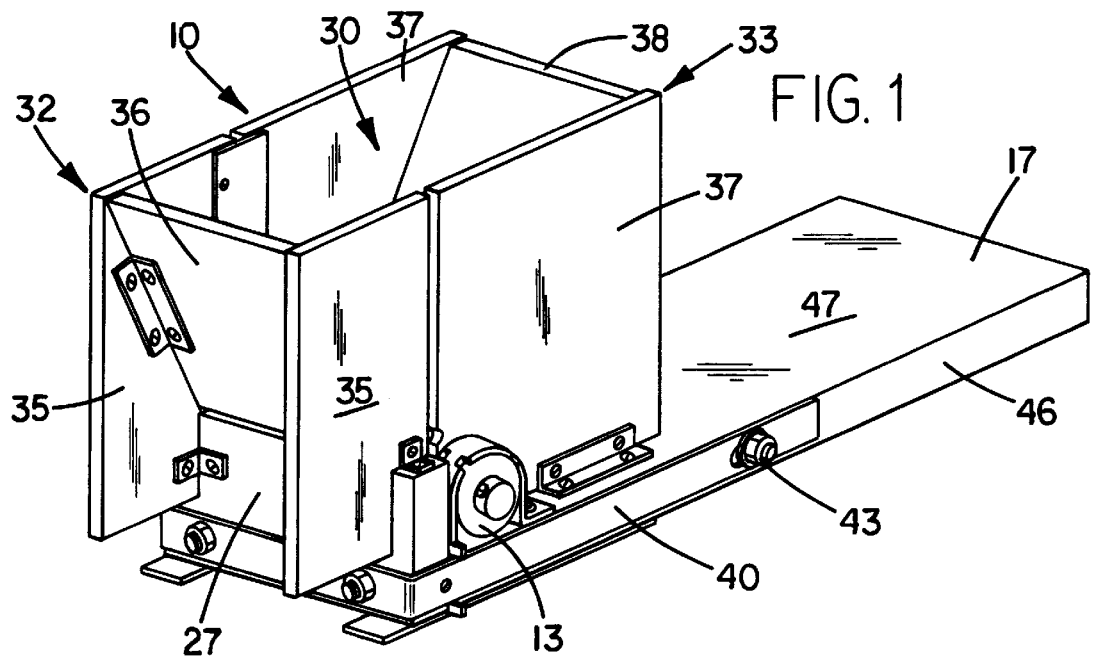
FIG. 1 is a perspective side view of a new mechanical nut cracker according to the present invention.
Figure 2:
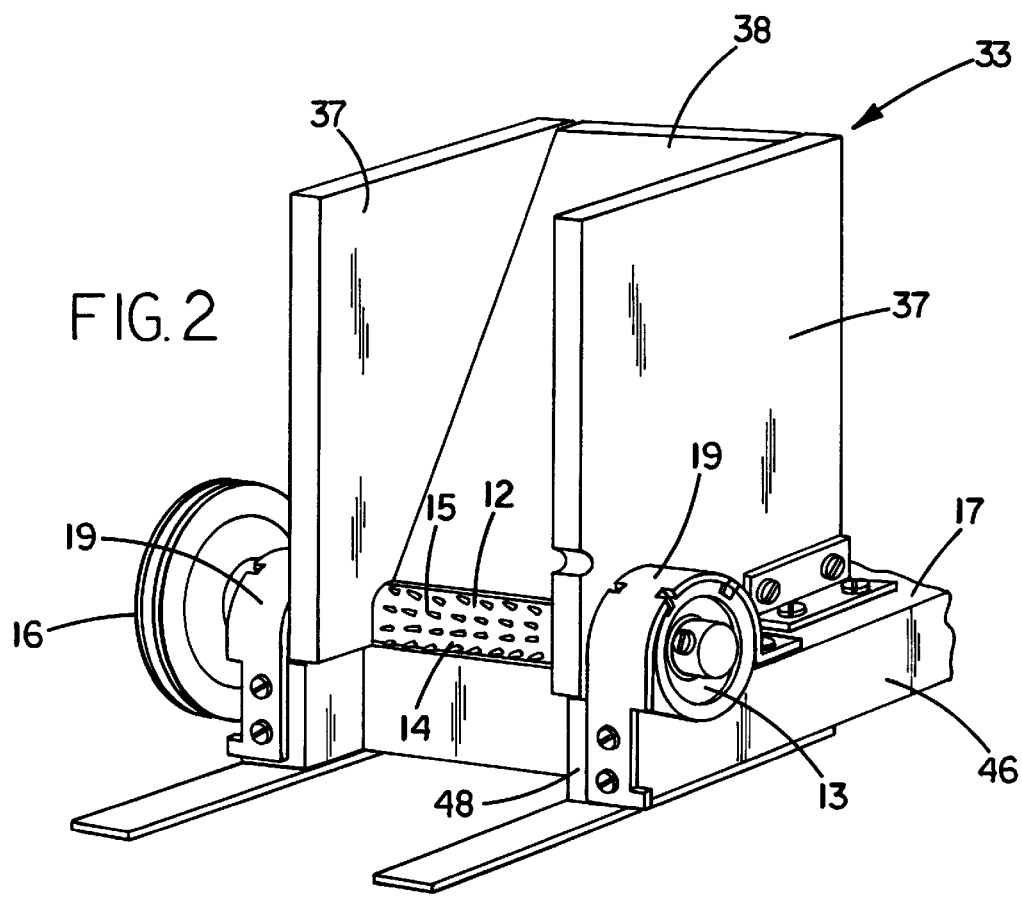
FIG. 2 is a perspective side view of the crusher bar assembly and rear portion of the hopper assembly of the present invention.
Figure 3:
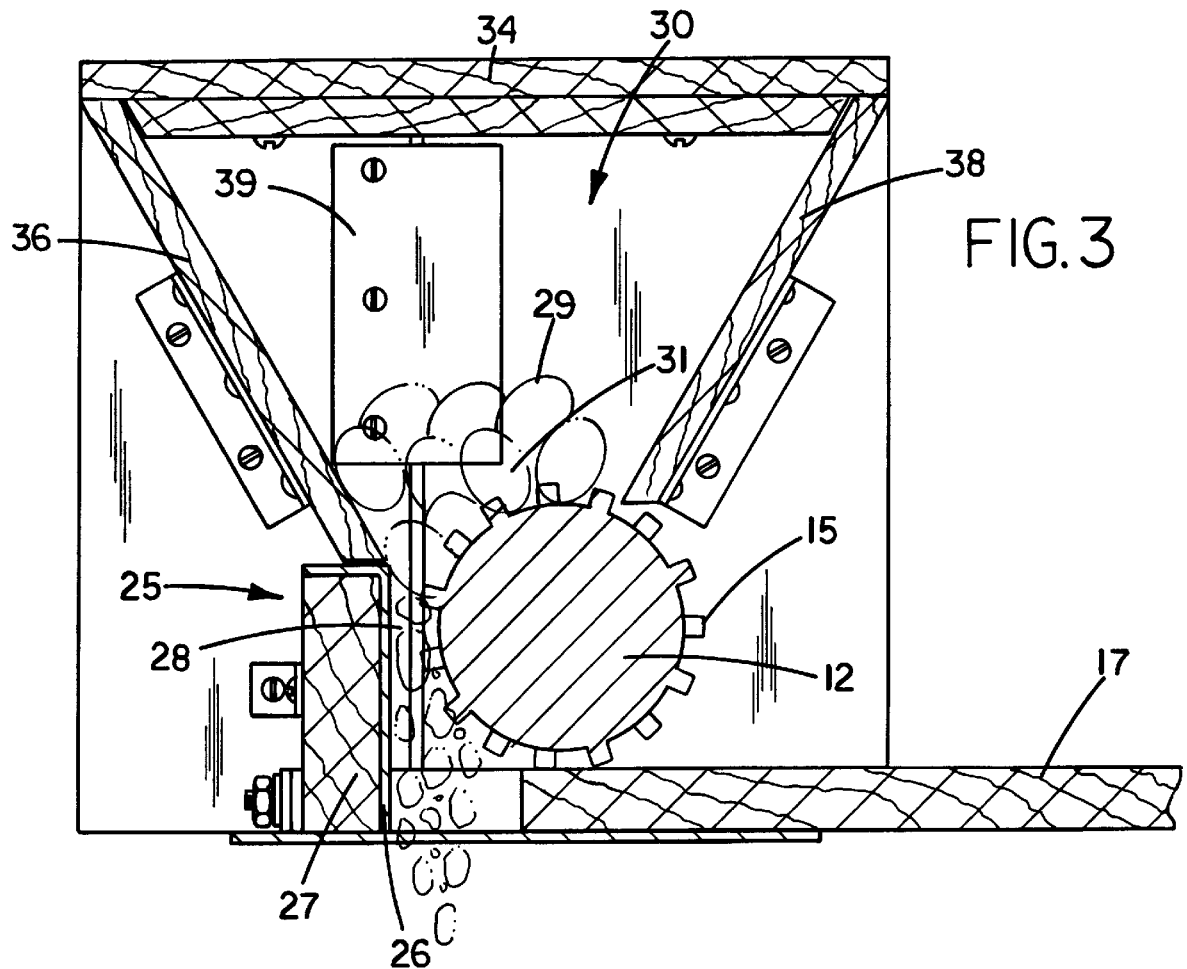
FIG. 3 is a cross sectional view of the present invention in operation.
Figure 4:
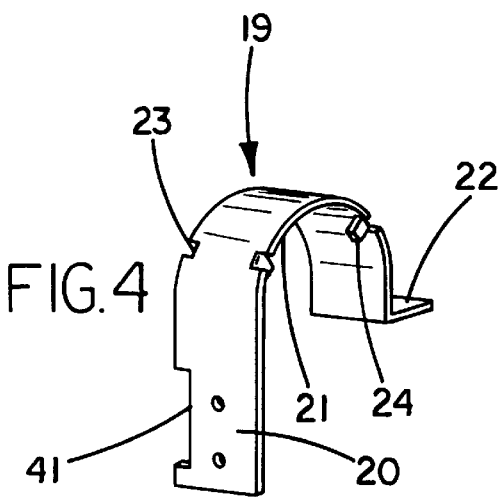
FIG. 4 is a perspective side view of a bearing bracket of the present invention.

With reference now to the drawings, and in particular to FIGS. 1 through 6 thereof, a new mechanical nut cracker embodying the principles and concepts of the present invention and generally designated by the reference numeral 10 will be described.

As best illustrated in FIGS. 1 through 6, the mechanical nut cracker 10 generally comprises a crusher bar assembly 11 with a crusher bar 12. The crusher bar 12 has a pair of bearings 13 coupled proximate its ends and a mid section 14 that has a plurality of protrusions 15 extending outward. A pulley member 16 is coupled to one end of the crusher bar 12 for facilitating rotation of the crusher bar 12.

The crusher bar assembly 11 is coupled to a base member 17 proximate the base member's end surface 48. The upper surface of the base member 17 has a pair of generally arcuate depressions 18 (see FIG. 5). Each of the depressions 18 receives an associated one of the bearings 13 coupled to the crusher bar 11. A pair of bearing brackets 19 couples the crusher bar 12 to the base member 17. Each bearing bracket 19 has a planar lower portion 20 for coupling to an end surface 48 of the base member 17. Each bearing bracket 19 also has an arcuate medial portion 21 for holding an associated bearing 13 coupled to the crusher bar 12. In addition, each bearing bracket 19 has a planar end portion 22 for coupling to an upper surface 47 of the base member 17. Moreover, each of the bearing brackets has a plurality of notches 23. The notches 23 each have a tab 24 extending orthogonally from an interior edge of the notch 23. The tabs 24 prevent lateral movement of the crusher bar 12.

The mechanical nut cracker 10 also has a crusher plate assembly 25. The crusher plate assembly 25 comprises a steel crusher plate 26 coupled to a backing member 27. The crusher plate assembly 25 is coupled to the base member 17 in a manner such that the crusher plate 26 opposes the crusher bar 12 thereby forming a gap 28 between the crusher bar 12 and the crusher plate 26. The plurality of protrusions 15 on the crusher bar 12 extends outward into the gap 28 for shelling nuts 29 passing through said gap 28.

The mechanical nut cracker 10 also has a hopper assembly 30 that is adapted for holding a plurality of unshelled nuts 29. The hopper assembly 30 has a bottom opening 31 that is positioned over the gap 28 formed by the crusher bar 12 and the crusher plate 26. Moreover, The hopper assembly 30 is adapted for directing unshelled nuts 29 towards said gap 28. In addition, the hopper assembly 30 has a front portion 32 that is coupled to the crusher plate assembly 25 and a rear portion 33 that is coupled to the base member 17. The hopper assembly 30 includes a cover member 34 for covering the plurality of unshelled nuts 29 during use.

The front portion 32 of the hopper assembly 30 has a pair of front portion side walls 35 and a forward wall 36 extending between the front portion side walls 35. The rear portion 33 of the hopper assembly 30 has a pair of rear portion side walls 37 and a rear wall 38 extending between the rear portion side walls 37. The forward wall 36 and the rear wall 38 each having a respective lower edge. The lower edges of the forward 36 and rear 38 walls are angled towards each other and are positioned over the gap 28 formed by the crusher bar 12 and crusher plate 26 in a manner such that the hopper assembly 30 directs unshelled nuts 29 towards the gap 10.

The front portion 32 of the hopper assembly 30 and crusher plate 26 is extendable and retractable with respect to the rear portion 33 of the hopper assembly 30 and base member 17 whereby the gap 28 between the crusher plate 26 and the crusher bar 12 is adjustable.

The hopper assembly 30 also has a pair of side gap cover members 39 for stopping the unshelled nuts 29 from falling out of the sides of the hopper assembly 30 as the gap 28 between the crusher plate 26 and the crusher bar 12 is adjusted. Each side gap cover member 39 is coupled to an associated one of the front portion side walls 35. Each side gap cover member 39 extends outward from its associated front portion side wall 35 and covers the space between the associated front portion side wall 35 and the associated rear portion side wall 37.

The mechanical nut cracker 10 has a pair of attachment plates 40 that extend from the crusher plate assembly 25 along sides 46 of the base member 17. Each attachment plate 40 extends through an associated cutout portion 41 of the planer lower portion 20 of one of the bearing brackets 19. The attachment plates 40 each have a respective slot 42 and a pair of bolts 43 coupled to the base member 17. Each bolt 17 is inserted through an associated one of the slots 42 in the attachment plates 40. Each bolt 43 may be tightened to hold the crusher plate assembly 25 in a static position relative to the base member 17 during use. In addition, each attachment plate 40 has a plurality of adjustment notches 44 extending along its lower edge (see FIG. 6).

The mechanical nut cracker 10 also has a pair of adjustment members 45 that extend out from the side surfaces of the base member 17. Each of the adjustment members 45 are positioned for engaging a selectable one of the plurality of adjustment notches 44 of an associated one of the attachment plates 40. The adjustment members 45 help facilitate the sizing of the gap 28 to accommodate shelling various sizes of nuts 29.

In use, the user simply places the nuts 29 he or she wants shelled in the hopper assembly 30. The attachment plates 40 are adjusted so the gap 29 between the crusher bar 12 and the crusher plate 26 is appropriate for the nuts 29 to be shelled. The cover 34 is then placed on the hopper assembly 30 and the pulley member 16 is turned crushing the shells. The pulley member 16 may be turned by any means that provides sufficient force to crush the shells.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A nut cracking machine, comprising:

a base member;

a crusher bar assembly having a crusher bar, said crusher bar assembly being coupled to said base member proximate an end of said base member;

a crusher plate assembly having a crusher plate, said crusher plate assembly being coupled to said base member such that said crusher plate opposes said crusher bar to form a gap between said crusher bar and said crusher plate, said crusher bar having a plurality of protrusions extending outwardly into said gap for shelling nuts passing through said gap;

a hopper assembly adapted for holding a plurality of unshelled nuts, said hopper assembly having a bottom opening, said hopper assembly being coupled to said base assembly such that said bottom opening is positioned over said gap formed by said crusher bar and said crusher plate whereby said hopper assembly is adapted for directing unshelled nuts towards said gap.

2. The nut shelling machine of claim 1, further comprising:

said hopper assembly having a front portion coupled to said crusher plate assembly and a rear portion coupled to said base assembly;

said front portion and said crusher plate being extendable and retractable with respect to said rear portion and said base member whereby said gap between said crusher plate and said crusher bar is adjustable.

3. The nut shelling machine of claim 2, further comprising:

a pair of attachment plates extending from said crusher plate assembly along sides of the base member;

the attachment plates each having a respective slot; and a pair of bolts couplable to said base member, each bolt being insertable through an associated one of said slots in said attachment plates, each bolt being tightenable for holding said crusher plate assembly in a static position relative to said base member during use.

4. The nut shelling machine of claim 2, further comprising:

a pair of side gap cover members, each side gap member being coupled to an associated one of said front side walls and extending outwardly from said associated front side wall for covering a space between said associated front side wall and an associated one of said rear side walls.

5. The nut shelling machine of claim 1, further comprising:

said crusher bar assembly including a pair of bearing brackets for coupling said crusher bar to said base member, each bearing bracket having a planar lower portion for coupling to an end of an associated one of said extensions, an arcuate medial portion for holding an associated connection portion of said crusher bar, and a planar end portion for coupling to an upper surface of said base member.

6. The nut shelling machine of claim 1, further comprising:

a pulley member coupled to one end of said crusher bar for facilitating rotation of said crusher bar.

7. The nut shelling machine of claim 5, further comprising:

said upper surface of said base member having a pair of generally arcuate depressions, each depression being for receiving an associated one of said connection portions of said crusher bar.

8. The nut shelling machine of claim 1, further comprising:

said crusher plate assembly including a backing member, said crusher plate being coupled to said backing member.

9. The nut shelling machine of claim 2, further comprising:

said front portion having a pair of front portion side walls and a forward wall extending between said front portion side walls, said rear portion having a pair of rear portion side walls and a rear wall extending between said rear portion side walls, said forward wall and said rear wall each having a respective lower edge, said lower edges of said forward and rear walls being angled towards each other such that said lower edges are positioned over said gap formed by said crusher bar and said crusher plate whereby said hopper assembly is adapted for directing unshelled nuts towards said gap.

10. The nut shelling machine of claim 5, further comprising:

each said bearing bracket having a plurality of notches, each notch having a tab extending orthogonally from an interior edge of said notch, said tabs being for preventing lateral movement of said crusher bar.

11. The nut shelling machine of claim 5, further comprising:

a pair of attachment plates extending from said crusher plate assembly along sides of the base member;

the attachment plates each having a respective slot;

a pair of bolts couplable to said base member, each bolt being insertable through an associated one of said slots in said attachment plates, each bolt being tightenable for holding said crusher plate assembly in a static position relative to said base member during use;

each planar lower part of each bearing bracket having a cutout portion, each attachment plate extending through an associated one of said cutouts in an associated one of said bearing brackets.

12. The nut shelling machine of claim 3, further comprising:

each attachment plate having a plurality of adjustment notches extending along a lower edge of said attachment plate;

a pair of adjustment members extending from an upper surface of said base member, each adjustment member being positioned for engaging a selectable one of said plurality of adjustment notches of an associated one of said attachment plates for facilitating sizing of said gap to accommodate shelling various sizes of nuts.

13. The nut shelling machine of claim 1, further comprising:

said hopper assembly including a cover member for covering said plurality of unshelled nuts during use.

14. A nut cracking machine, comprising:

a base assembly having a pair of extensions;

a crusher bar assembly having a rotatable crusher bar, said crusher bar assembly being coupled to said base member proximate an end of said base member;

a crusher plate assembly having a crusher plate, said crusher plate assembly being coupled to said base member such that said crusher plate opposes said crusher bar to form a gap between said crusher bar and said crusher plate, said crusher bar having a plurality of protrusions extending outwardly into said gap for shelling nuts passing through said gap;

a hopper assembly adapted for holding a plurality of unshelled nuts, said hopper assembly having a bottom opening, said hopper assembly being coupled to said base assembly such that said bottom opening is positioned over said gap formed by said crusher bar and said crusher plate whereby said hopper assembly is adapted for directing unshelled nuts towards said gap;

said hopper assembly having a front portion coupled to said crusher plate assembly and a rear portion coupled to said base assembly;

said front portion and said crusher plate being extendable and retractable with respect to said rear portion and said base member whereby said gap between said crusher plate and said crusher bar is adjustable;

a pair of attachment plates extending from said crusher plate assembly along sides of the base member;

the attachment plates each having a respective slot; and a pair of bolts couplable to said base member, each bolt being insertable through an associated one of said slots in said attachment plates, each bolt being tightenable for holding said crusher plate assembly in a static position relative to said base member during use;

a pair of side gap cover members, each side gap member being coupled to an associated one of said front portion side walls and extending outwardly from said associated front side wall for covering a space between said associated front side wall and an associated one of said rear portion side walls;

said crusher bar assembly including a pair of bearing brackets for coupling said crusher bar to said base member, each bearing bracket having a planar lower portion for coupling to an end of an associated one of said extensions, an arcuate medial portion for holding an associated connection portion of said crusher bar, and a planar end portion for coupling to an upper surface of said base member;

a pulley member coupled to one end of said crusher bar for facilitating rotation of said crusher bar;

said upper surface of said base member having a pair of generally arcuate depressions, each depression being for receiving an associated one of said connection portions of said crusher bar;

said crusher plate assembly including a backing member, said crusher plate being coupled to said backing member;

said front portion having a pair of front portion side walls and a forward wall extending between said front portion side walls, said rear portion having a pair of rear portion side walls and a rear wall extending between said rear portion side walls, said forward wall and said rear wall each having a respective lower edge, said lower edges of said forward and rear walls being angled towards each other such that said lower edges are positioned over said gap formed by said crusher bar and said crusher plate whereby said hopper assembly is adapted for directing unshelled nuts towards said gap;

each said bearing bracket having a plurality of notches, each notch having a tab extending orthogonally from an interior edge of said notch, said tabs being for preventing lateral movement of said crusher bar;

each planar lower part of each bearing bracket having a cutout portion, each attachment plate extending through an associated one of said cutout portions in an associated one of said bearing brackets;

each attachment plate having a plurality of adjustment notches extending along a lower edge of said attachment plate;

a pair of adjustment members extending from a side upper surface of said base member, each adjustment member being positioned for engaging a selectable one of said plurality of adjustment notches of an associated one of said attachment plates for facilitating sizing of said gap to accommodate shelling various sizes of nuts; and said hopper assembly including a cover member for covering said plurality of unshelled nuts during use.

* * * * *